United States Patent
Fleming et al.

(10) Patent No.: US 7,032,100 B1
(45) Date of Patent: *Apr. 18, 2006

(54) SIMPLE ALGORITHMIC CRYPTOGRAPHY ENGINE

(75) Inventors: George Samuel Fleming, Romsey (GB); Farrell L. Ostler, Albuquerque, NM (US); Antoine Farid Dagher, Albuquerque, NM (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,392

(22) Filed: Dec. 17, 1999

(51) Int. Cl.
*G06F 12/00* (2006.01)

(52) U.S. Cl. .................. 712/205; 711/110; 711/212; 711/214; 711/219; 708/672

(58) Field of Classification Search ............ 708/672; 711/110, 212, 214, 219, 210; 712/205, 221, 712/225, 241
See application file for complete search history.

(56) References Cited

U.S. PATENT DOCUMENTS

| | | | | |
|---|---|---|---|---|
| 4,128,878 A | | 12/1978 | Yasuhara et al. | 364/200 |
| 4,399,507 A | | 8/1983 | Cosgrove et al. | 364/200 |
| 4,987,595 A | | 1/1991 | Marino, Jr. et al. | 380/50 |
| 5,053,952 A | | 10/1991 | Koopman, Jr. et al. | 364/200 |
| 5,117,498 A | | 5/1992 | Miller et al. | 395/775 |
| 5,161,247 A | | 11/1992 | Murakami et al. | 395/800 |
| 5,365,591 A | | 11/1994 | Carswell et al. | 380/49 |
| 5,463,749 A | * | 10/1995 | Wertheizer et al. | 711/110 |
| 5,623,621 A | * | 4/1997 | Garde | 711/220 |
| 5,924,114 A | * | 7/1999 | Maruyama et al. | 711/110 |
| 6,167,488 A | * | 12/2000 | Koppala | 711/132 |

FOREIGN PATENT DOCUMENTS

EP 0908813 4/1999

OTHER PUBLICATIONS

Hill et al., Digital Systems: Hardware Organization and Design, John Wiley & Sons, 1978, pp. 19–21, 164–165, and 186.*

* cited by examiner

*Primary Examiner*—William M. Treat
(74) *Attorney, Agent, or Firm*—Michael J. Ure

(57) ABSTRACT

A processor architecture and instruction set is provided that is particularly well suited for cryptographic processing. A variety of techniques are employed to minimize the complexity of the design and to minimize the complexity of the interconnections within the device, thereby reducing the surface area required, and associated costs. A variety of techniques are also employed to ease the task of programming the processor for cryptographic processes, and to optimize the efficiency of instructions that are expected to be commonly used in the programming of such processes. In a preferred low-cost embodiment, a single-port random-access memory (RAM) is used for operand storage, few data busses and registers are used in the data-path, and the instruction set is optimized for parallel operations within instructions. Because cryptographic processes are characterized by operations on wide data items, particular emphasis is placed on the efficient processing of multi-word operations, including the use of constants having the same width as an instruction word. A simplified arithmetic unit is provided that efficiently supports the functions typically required for cryptographic operations with minimal overhead. A microcode-mapped instruction set is utilized in a preferred embodiment to facilitate multiple parallel operations in each instruction cycle and to provide direct processing control with minimal overhead.

6 Claims, 4 Drawing Sheets

SIMPLE ALGORITHMIC CRYPTOGRAPHY ENGINE

BACKGROUND OF THE INVENTION

1. Field of the Invention

This invention relates to the field of processing systems, and in particular to a processor for use in a cryptographic system

2. Description of Related Art

The use of cryptography for encoding electronic content material continues to increase. In the entertainment field, digital audio and video recordings are encrypted to protect the material from unauthorized copying. In the communications field, documents are encrypted to prevent unauthorized viewing, and encrypted certificates are used to verify the authenticity of a document.

A number of standards have been adopted or proposed for encrypting copyright content material, or security items such as tickets that are associated with access to the copyright content material, each time the material is transferred from one device to another. For example, when a "compliant" CD-recorder creates a CD that contains a copy of copy-protected material, the recording will be cryptographically protected so that only a "compliant" CD-player will be able to render the material. "Compliant" devices are devices that enforce the adopted standard. If the original copy-protected content material has a "copy-once" copy limitation, the compliant CD-recorder will cryptographically mark the copy of this original with a "copy-never" notation. A compliant CD-recorder will recognize this "copy-never" notation and will not create a copy of this copy. If the material is copied by a non-compliant recorder, it will not contain the appropriate cryptographic item, and a compliant recorder or playback device will not record or render this copied material.

Standards have also been adopted for encrypting, signing, and authenticating transmitted content material, such as e-mail documents and attachments. The content material may be encrypted, and/or a cryptographically secure item may be attached to the content material that identifies the source of the content material. The secure item is attached, or "bound", to the material in such a manner that a decryption of the secure item will identify whether the content material has been modified since it was originally transmitted.

The above examples of the increased use of encryption and decryption techniques, and in particular the increased use of cryptographic signing and verification and access ticketing, necessitates the inclusion of encrypting or decrypting devices in a variety of electronic devices. Every compliant audio or video recording or playback device, including both stationary and portable devices, must contain a means for processing or exchanging keys or other secure items, and generally must contain a cryptographic signing or verification device, or both. Every e-mail transmission or reception device, including multi-functioned devices such as cell-phones, will be expected to contain a signing or verification device, or both. Thus, a need exists for a processing device that facilitates cryptographic signing, verification, and key processing in a variety of systems.

Although a custom designed circuit may be the least costly embodiment of a device that implements an encryption or decryption process for digital signing, verification and other authentication tasks, the evolving nature of cryptography introduces the risk that the embodied algorithm will become obsolete. A general-purpose programmable processor will allow the embodied algorithm to change as cryptographic techniques change, but will not necessarily be economically feasible for inclusion in every device that requires cryptographic capabilities. A low-cost general-purpose processor may not achieve the performance goals expected on a real-time authentication process, for example, and auxiliary devices or a higher-speed processor may be required, at an increased cost. Even if the cost objectives can be met by a low-cost processor and auxiliary devices, the physical constraints of the containing system, such as a cell phone, may preclude the use of these auxiliary devices.

BRIEF SUMMARY OF THE INVENTION

It is an object of this invention to provide a programmable processing system that facilitates cryptographic authentication. It is a further object of this invention to provide a cryptographic processing system that is optimized for common encryption and decryption utility functions. It is a further object of this invention to provide a low-cost cryptographic processing system.

These objects, and others, are achieved by providing a processor architecture and instruction set that is particularly well suited for cryptographic processing. A variety of techniques are employed to minimize the complexity of the design and to minimize the complexity of the interconnections within the device, thereby reducing the surface area required, and associated costs. A variety of techniques are also employed to ease the task of programming the processor for cryptographic processes, and to optimize the efficiency of instructions that are expected to be commonly used in the programming of such processes. In a preferred low-cost embodiment, a single-port random-access memory (RAM) is used for operand storage, few data busses and registers are used in the data-path, and the instruction set is optimized for parallel operations within instructions. Because cryptographic processes are characterized by operations on wide data items, particular emphasis is placed on the efficient processing of multi-word operations, including the use of constants having the same width as an instruction word. A simplified arithmetic unit is provided that efficiently supports the functions typically required for cryptographic operations with minimal overhead. A microcode-mapped instruction set is utilized in a preferred embodiment to facilitate multiple parallel operations in each instruction cycle and to provide direct processing control with minimal overhead.

BRIEF DESCRIPTION OF THE DRAWINGS

The invention is explained in further detail, and by way of example, with reference to the accompanying drawings wherein.

Figure 1:
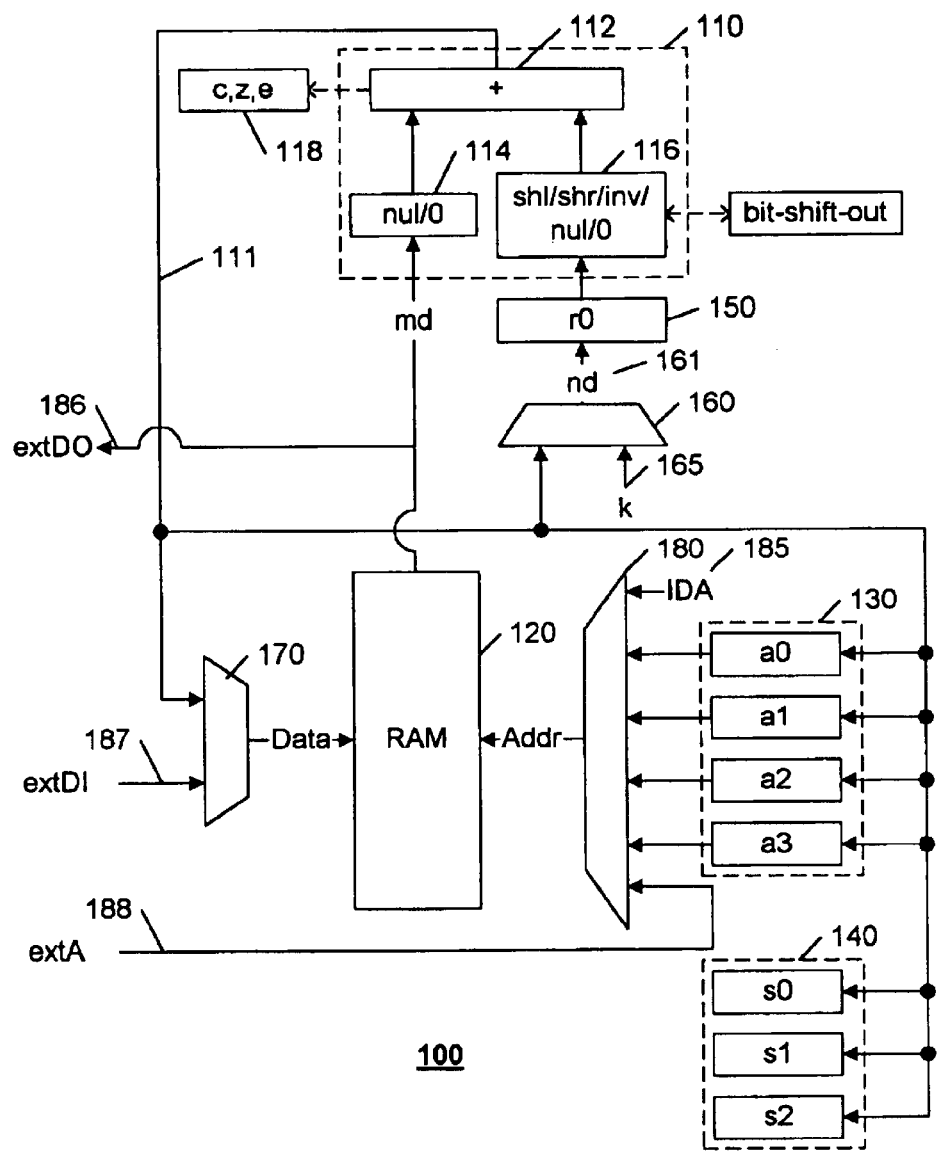
FIG. 1 illustrates an example block diagram of a data path architecture for a cryptographic processing system in accordance with this invention.

Throughout the drawings, the same reference numerals indicate similar or corresponding features or functions. Throughout the following description, reference numerals between 100 and 199 refer to items introduced in FIG. 1; reference numerals between 200 and 299 refer to items introduce in FIG. 2; reference numerals between 300 and 399 refer to items introduced in FIG. 3, and reference numerals between 400 and 499 refer to items introduced in FIG. 4.

DETAILED DESCRIPTION OF THE INVENTION

This invention is based on the observation that cryptographic operations, such as digital signing and verification, public-private key exchange processes, and so on, typically involve large data variables, but relatively simple arithmetic operations. A common algorithm for authentication systems is Digital Signature Algorithm (DSA). Another common algorithm that has been proposed as a standard (ANSI X9.62) for digital signing and verification is the Elliptic Curve Digital Signature Algorithm (ECDSA). This algorithm, as incorporated in the Digital Transmission Content Protection system (DTCP) has been adopted for inclusion in digital audio and video products equipped with IEEE-1394 connections. The ECDSA is particularly well suited for a low-cost embodiment, because the use of elliptical curves involves the simple mathematical operations of addition, subtraction, multiplication, and inversion.

The size of the data variable used for digital signing and verification is large, typically 160 or 320 bits wide. A 32-bit wide data word size is used in a preferred embodiment, to evenly divide the data item into five or ten words. The selected data word size is a design tradeoff: a larger word size requires additional wiring and routing, and a smaller word size requires additional word operations per data item. Recognizing that a wide data word incurs significant wiring and routing overhead, the data flow and control structure in accordance with this invention is significantly limited compared to conventional processing systems.

In a preferred embodiment, a single ROM for instructions and constants and a single RAM for variables are preferred, to minimize circuit complexity and routing. Because the data constants are preferably the same size as the data word, and are preferably stored in the same ROM as the instructions, the instruction word size in a preferred embodiment is equal to the data word size.

The aforementioned simple mathematical operations on the data items suggests a minimal number of required instructions, whereas an instruction word size that equals a data word size suitable for wide data items allows for a large number of different instructions. Recognizing that speed of processing is important, the 32 bits available for each instruction are structured in accordance with this invention to allow for multiple parallel operations within each instruction.

FIG. 1 illustrates an example block diagram of a data flow architecture 100 of a processing system in accordance with this invention. As can be seen by the simplicity of this block diagram, the processing system is optimized for minimal routing complexity, as compared to conventional 32-bit processing systems. Of significance, note that the arithmetic-unit (AU) 110 comprises merely an adder 112 and two pre-op devices 114, 116. This simplicity provides a consistency of operation that facilitates parallel operations. Also of significance, note that the memory 120 is a single port RAM with a minimal output fanout. This minimal fanout also provides a consistency of operation that facilitates parallel operations, as well as providing a minimization of data routing paths. In like manner, the registers 130, 140 are configured with a single input, from the output 111 of the AU 110, and limited output. The contents of the address registers 130 for example, are provided solely for addressing the RAM 120, and cannot be provided as an input to the AU 110, or any other processing devices, as would typically be common in a conventional processor design. The registers 140 do not provide an output per se, but are used, as discussed further below, to provide condition bits for controlling repetitive operations, such as multiplication. This restricted use of registers 130, 140 minimizes the routing of interconnections required for each register, and allows the registers 130, 140 to be optimally sized for the function served. For example, the address registers 140 need only be wide enough to span the address range of the memory 120, while the scan registers 140 need only be wide enough to contain the relevant control flags.

Figure 2:
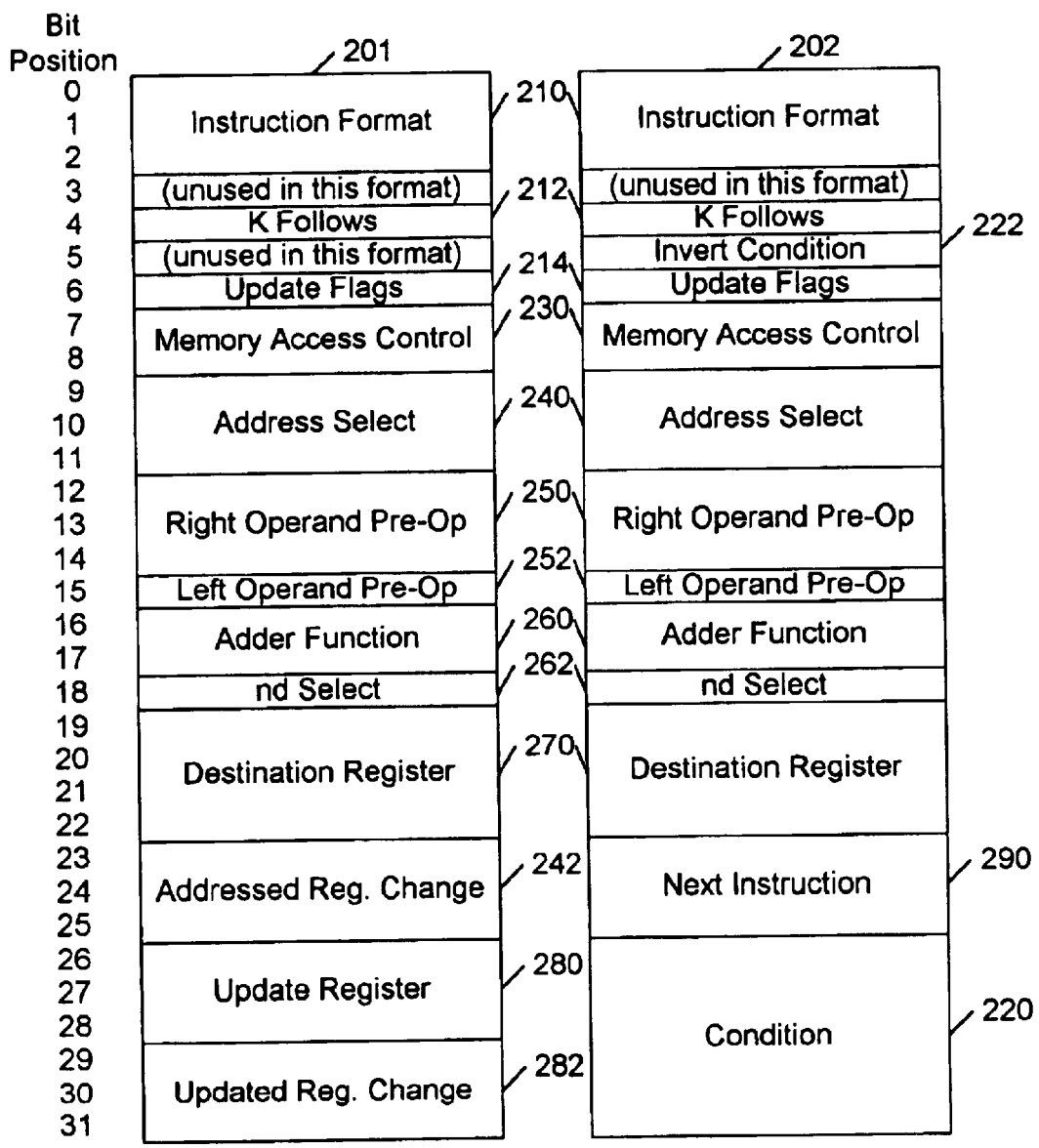
FIG. 2 illustrates an example pair of instruction set formats for a cryptographic processing system in accordance with this invention.

The efficiency and effectiveness of the architecture 100 is best illustrated with regard to FIG. 2, which illustrates two example instruction formats 201, 202 in accordance with this invention. As can be seen, the instruction formats 201, 202 have a large number of common instruction fields. Because relatively few instruction types are required for cryptographic processing, a preferred embodiment of an instruction set comprising 32 bits for each instruction includes the use of multiple fields within each instruction, discussed below, to effect parallel operations within each instruction. These multiple fields would not be available in a conventional narrow-word instruction set embodiment that is configured to support the relatively few instruction types, or would be infeasible for inclusion in a wide-word instruction set embodiment that is configured to support a large number of instruction types.

The instruction format field 210 identifies the particular format used for the instruction, and provides the distinction between the illustrated formats 201, 202 and others. In a preferred embodiment, three bits are provided, thereby supporting up to eight different formats. In accordance with this invention, the eight different formats will exhibit a strong correlation of instruction bits, to simplify the decoding of instruction fields. Select fields are common to each of the different formats, so that commonly utilized parallel operations can be performed regardless of the format type. For example, in a preferred embodiment, the fields 230, and 240 are common to each format type, so that the operation implied by the value in each field 230, and 240, the control and selection of a memory access, can be effected during each instruction cycle, regardless of the particular instruction that is being performed. Other commonly used fields, such as fields 212 and 214 are also included in each instruction format. Also, as discussed further below with regard to FIG. 4, fields that are unavailable within a given format default to a relatively consistent and predictable state, thereby providing a further functional similarity among instructions regardless of format.

The "k follows" field 212 is used to signal that the following "instruction" contains a constant, or data-item, k. The use of this field 212 provides at least two advantages: it allows the constant k that is contained in the next instruction to occupy the entire instruction word size (in a preferred embodiment, 32 bits), and, it allows this value k that is contained in the next instruction to be loaded into the register r0 at the next instruction cycle. In a conventional fixed-instruction size processing system, a bit is typically set aside in both the instruction word and the constant word to distinguish between the two, thereby limiting the size of the constant word to one bit less than the full instruction width. Not illustrated, alternative formats are provided that contain a "constant" field within the instruction; in these formats, the constant k that is provided is less than 32 bits, and the unspecified higher-order bits associated with a 32-bit constant value of k are either zero-filled or sign-extended, depending upon the particular format. These foreshortened values of k are typically provided as offset values for computing a memory address relative to a base address, or as a distance value for a relative branch instruction, specifying how far to branch from the current instruction location to reach the next intended instruction.

The "update flags" field 214 is used to identify whether or not to modify the condition flags associated with the processing system when this instruction is executed. Copending U.S. patent application "Branch Instructions with Decoupled Condition and Address", Ser. No. 09/466,405, filed Dec. 17, 1999 for Farrell Ostler and Antoine Dagher, (Disclosure 701046), incorporated by reference herein, discloses the decoupling of condition evaluations from branch instructions, and other conditional instructions, including the express identification of when condition flags should be saved for subsequent use in a conditional instruction. When the field 214 contains an affirmative value, the conventional system flags 118 of FIG. 1, such as carry, zero, and even, and other condition flags, discussed below, are saved, and not updated until another instruction contains an affirmative value in field 214.

The "memory access control" field 230 determines whether the memory 120 is accessed, and if so, whether it is accessed for a read operation or a write operation. As discussed above, the memory 120 is a single port memory, and the fanout of the memory 120 is limited, thereby allowing for a relatively simple memory access control. As also noted above, the field 230 is common to all instructions, thereby allowing for a memory read or write in parallel with any other instruction.

The "address select" field 240 determines which input to the selector 180 is used to address the memory 120. The selected address may be an indirect address location IDA 185, the output 111 of the AU 110, an external address extA 188, or one of the address registers 130. As noted above, by providing the field 240 within all instructions, a memory select operation can be effected in parallel with any other instruction. It is also significant to note that there is no register element between the memory 120 and the AU 110, as would typically be found in a conventional processing system, thereby allowing the AU 110 to access memory items directly, without an intermediate "load register" instruction. The "addressed register change" field 242 operates in conjunction with the address select field 240, and allows for incrementing or decrementing the addressed register during the same instruction cycle that the memory contents at the incremented or decremented address is provided to the AU 110. Copending U.S. patent application "Circular Address Register", Ser. No. 09/466,404, filed Dec. 17, 1999 for Farrell Ostler and Antoine Dagher, (Disclosure 701047), incorporated by reference herein, discloses a circular address register that is configured to allow for "circular increment" and "circular decrement" instructions that automatically adjust the pointer to the register to provide a circular addressing function. The addressed register change field 242 in a preferred embodiment of this invention includes states that effect the circular increment and decrement functions for each of the address registers 130, as determined by the address select field 240. As will be evident to one of ordinary skill in the art, the ability to circularly increment an address, provide the contents of the circularly incremented address to an AU, perform an arithmetic operation on the contents, store the result in a destination register (discussed below), and circularly increment another register (discussed below), all within a single instruction cycle, is particularly well suited for cryptographic and other applications involving multi-word data items.

Also note that the external address extA 188 allows an external processor to access the RAM 120 substantially independent of the processing system 100. That is, in a preferred embodiment of this invention, for example, a host system can be given access to the RAM 120 by setting the address select field to an appropriate value that selects the extA 188 input for addressing the RAM 120. The host system can then load data directly into the RAM 120, to the location addressed by extA 188, via the extDI input 187. This input data could be, for example, a hash value that is bound to an electronic document or ticket and a key that is used to encrypt this hash value to form a digital signature associated with the document or ticket. After loading the hash value and key, the processing system 100 regains access to the RAM, performs the appropriate cryptographic function to provide a corresponding digital signature, which will be located in the RAM 120. The host system is then again provided direct access to the RAM 120 via extA 188, whereupon the host system reads the digital signature from the RAM 120, from each location addressed by extA 188, via the data out port extDO 186. That is, in accordance with this aspect of the invention, by providing an external addressing access to the RAM 120, the processing system 100 need not directly support memory transfer functions.

The next four fields, "right operand pre-op" 250, "left operand pre-op" 252, "adder function" 260, and "nd select" 262 control the operation of the AU 110 and associated components register r0 150 and selector 160. The left operand pre-op field 252 determines whether an addressed item in the memory 120 is to be used directly; if not, a zero is provided as the left operand input to the AU 110. In like manner, the nd select field 262 determines whether the output 111 of the AU 110, or a constant k 165, is provided as an input to the register r0 150. The right operand pre-op field 250 determines whether and how the contents of the register r0 150 is provided as the right input to the AU 110. The right operand pre-op field 250 provides for a direct communication of the contents of the register r0 150 to the adder 112 (a "null" pre-operation), a left and right shifting of the contents of the register r0 150, or an inversion of the contents of the register r0 150, as a parallel operation during the execution of the instruction. As the name of the field implies, this parallel operation is performed before the arithmetic operation specified in the instruction. The right operand pre-op field 250 also allows for a zero value to be supplied as the right input to the adder 112, thereby facilitating a transfer of a value md from the RAM 120 to another location in RAM 120, or to one of the registers 130, 140, 150. The adder function field 260 determines whether the addition of the left and right input to the AU includes an addition of a carry value, or an inverted carry, or a constant 1. Thus, the combination of pre-op functions 114 and 116 and the adder function 112 provides for monadic as well as dyadic addition functions, as well as subtraction, and multiplication and division by two. As will be evident to one of ordinary skill in the art, the ability to shift a prior result and add it to another operand with the carry bit within a single instruction cycle, as provided by the fields 250, 252, and 260 in accordance with this invention, is particularly well suited for the multiplication processes that are common in the field of cryptography, and other applications involving the multiplication of multi-word data items.

The "destination register" field 270 identifies where the result 111 of the operation at the AU 110 is routed. As noted above, to minimize routing complexity in a preferred embodiment, the fanout of the output 111 of the AU 110 is limited to the registers 130, 140, and to the input register r0 150 associated with the AU 110.

The "update register" field 280 and associated "update register change" field 282 defines yet another parallel operation that can be effected during the processing of the instruction. The update register change field 282 is similar to the addressed register change field 242, in that it can effect an increment or decrement to the update register that is identified by the update register field 280, including a circular pointer increment or decrement operation.

As demonstrated above, the instruction format 201 facilitates the execution of multiple operations in parallel during the execution of a single instruction that utilizes this format to perform a primary function, for example, an arithmetic operation. Alternative instruction formats, identified by the instruction format field 210, provide for other primary functions, while facilitating parallel operations.

The instruction format 202 of FIG. 2 illustrates an example format that is used in a preferred embodiment for a branch or call operation in parallel with other auxiliary operations. As noted above, the fields 212, 214, 230, and 240 are common to all instructions in a preferred embodiment, and as illustrated in FIG. 2, the fields 250, 252, 260, and 262 are common between the formats 201 and 202. Thus, the above referenced operations associated with fields 212, 214, 230, 240, 250, 252, 260 and 262 are performed at the same time that a branch or call operation is performed. As would be apparent to one of ordinary skill in the art, the ability to address, load, and perform an arithmetic operation on an operand in preparation for a branch or call to another routine that will process this operand provides a highly effective and efficient technique for iterative processes, such as commonly used in cryptography and other applications.

The "condition" field 220, and associated "invert condition" field 222, are used to determine which of two subsequent locations will be used to provide the next instruction to be executed. That is, if the condition 220 is in a first state, the program proceeds from a first address, otherwise it proceeds from a second address; the invert.condition field 222 determines whether the aforementioned first state corresponds to a "true" or a "false" state. As illustrated in FIG. 2, the condition field 220 in a preferred embodiment utilizes six bits; thereby, up to 64 different conditions can be tested. Of particular note, one of the conditions of field 220 in accordance with this invention includes a data-item-equals-zero condition, and another condition corresponds to a data-item-equals-one condition. The data-item-equals-zero condition is set to true when each of the data words corresponding to a multiple-word data item equals zero, and the data-item-equals-one condition is set to true when each of the data words corresponding to a multiple-word data item equals zero except the least significant data word, which contains a value of one. Other condition items include the state of particular bits in the scan registers 140, such as the least-significant and most-significant bits of each word stored in the scan registers 140, thereby facilitating efficient multiplication operations of multi-word multiplicands. Other condition items include the status of the address pointers that are used to select the address registers 130, to facilitate the identification of the beginning and end of a multi-word processing operation. As would be evident to one of ordinary skill in the art, providing up to 64 different conditions within a branch or call instruction provides for an efficient and effective means for controlling and optimizing complex iterative operations, such as the multiplication of multi-word operands, as typically performed in cryptographic operations.

Figure 3:
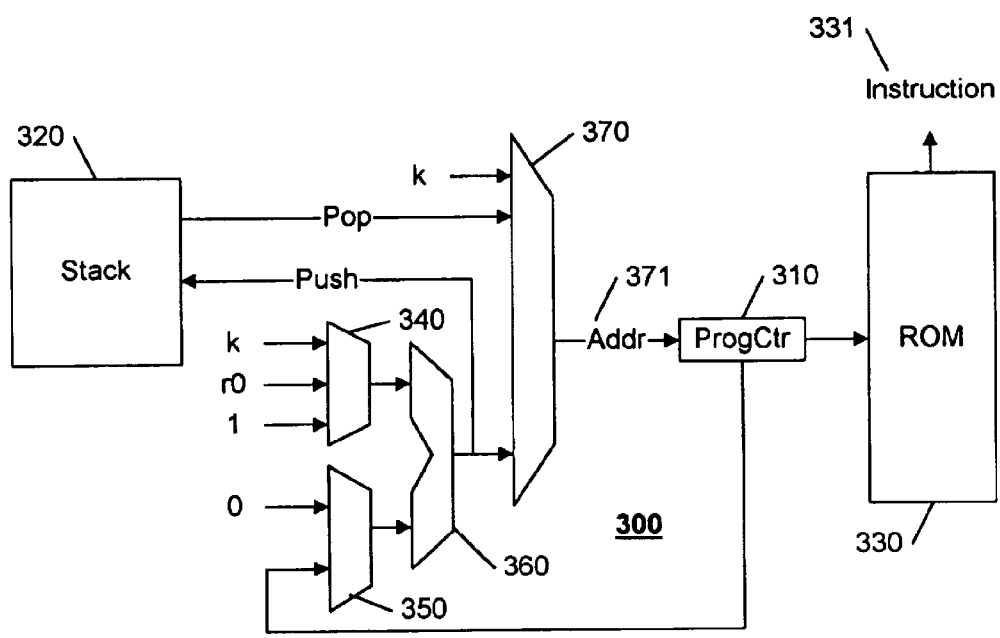
FIG. 3 illustrates an example block diagram of a control path architecture for a cryptographic processing system in accordance with this invention.

The "next instruction" field 290 controls the program flow by controlling the address from which each next instruction is provided to the processing system. FIG. 3 illustrates an example block diagram of a control path architecture 300 for a processing system in accordance with this invention. Each instruction 331 is provided to the processing system from a memory, illustrated in FIG. 3 as a ROM 330. The sequence of instruction-addresses 371 determines the sequence of individual instructions 331 that are provided to the processing system. The instructions 331 are formatted as discussed above with regard to FIG. 2. The program counter 310 contains the current instruction-address 371, and the selectors 340, 350, and 370 and adder 360 determine the address of the next instruction, based on the state of the next instruction field 290, as discussed below.

In a preferred embodiment of this invention, the next instruction field 290 provides for the following determinations of the next instruction:
i) PC<=PC+1. (sequence)
ii) If (cond) Then PC<=k Else PC<=pc+1. (branch to k if)
iii) If (cond) Then pc<=r0 Else pc<=PC+1. (branch to r0 if)
iV) If (cond) Then pc<=k; push(pc+1) Else pc<=PC+1. (call if)
v) If (cond) Then PC<=pop Else pc −=pc+1. (return if)
vi) If (cond) Then PC<=pC+k Else pc<=pc+1. (r. branch if)
vii) If (cond) Then pc<=k Else pc<=pop. (branch if else return)
viii) If (cond) Then PC<=pc+k Else pc<=pop. (r. branch if else return)

As would be evident to one of ordinary skill in the art, the first next-instruction-determination i is a sequential step to the next instruction, the program counter, pc, advancing by one. The second and third determinations ii and iii are each a conventional conditioned branch. If the condition is true (or if the condition is false and the "invert condition" field 222 is affirmative), the program counter pc is set to a specified address k, or to a determined address r0 (contained in register r0 150 of FIG. 1); otherwise, it is advanced by one. The fourth determination iii is a conventional conditional call, wherein if the condition is true, the next sequential instruction address, pc+1, is pushed onto the stack 320, and the program counter is set to the specified address k. The fifth determination v is a conventional conditional return, wherein if the condition is true, the prior pushed next sequential address after a call is popped off the stack 320 and placed into the program counter. The sixth determination vi is a conventional relative branch instruction, wherein a constant (positive or negative) is added to the current program counter to determine the address of the next instruction. Note that a single adder 360 handles both the program counter increment operation as well as the calculation of relative branch addresses.

Of particular significance, note the two determinations vii and viii. In accordance with one aspect of this invention, the instruction set includes a "Branch If, Else Return" instruction, wherein if the condition is true, the program branches to the specified or relative address, but if the condition is false, the program returns from a subroutine call by popping the return address off the stack. An "Else Return" construct within a conditional statement is particularly effective and efficient in subroutines that perform iterative operations, wherein the same instruction is used to branch to an address to effect the next iteration or to return when the iterations have been completed. Other variations of techniques for determining a subsequent next instruction will be evident to one of ordinary skill in the art in view of this disclosure.

Figure 4:
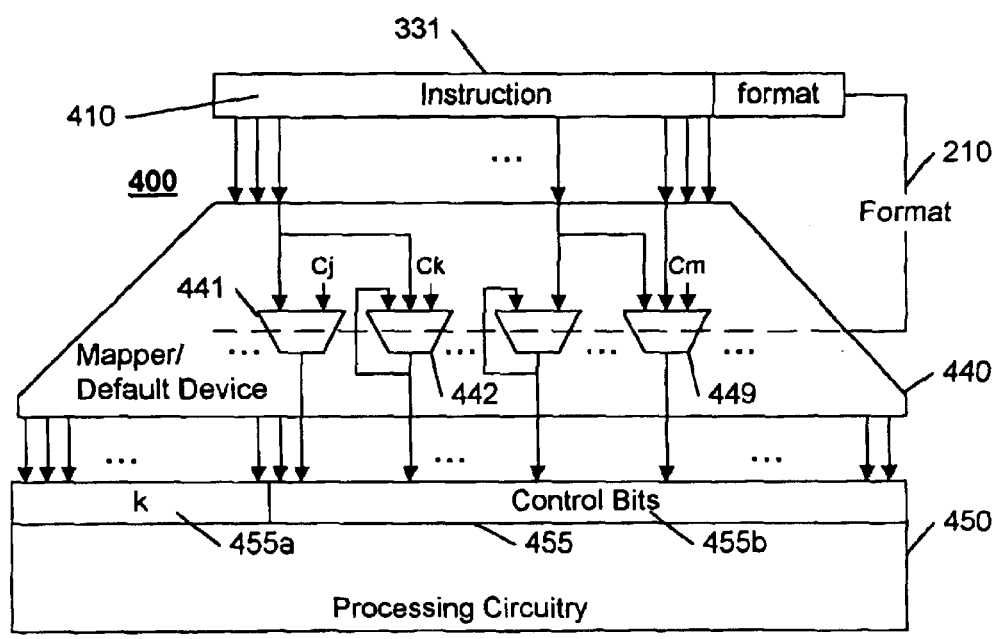
FIG. 4 illustrates an example block diagram of a micro-instruction mapping for a cryptographic processor in accordance with this invention.

FIG. 4 illustrates an example block diagram of a processor 400 that represents an effective and efficient structure for providing the features and capabilities discussed above. In the example of FIG. 4, processing circuitry 450 operates in response to a microcode instruction 455 that comprises control bits 455$b$ that control each switch and state device within the processing circuitry 450. That is, for example, the processing circuitry 450 typically comprises a state machine and the microcode instruction 455 provide the input stimuli to this state machine that controls the transition to the next state as well as controlling the production of an output from this state machine. The microcode instruction 455, for example, contains a control bit that will determine whether the selector 160 of FIG. 1 is set to provide the constant k 455$a$ that is also contained in the microcode instruction 455, or the output result 111 of the arithmetic unit AU 110, to the register r0 150. It also contains a set of control bits that determines which address input is selected by the selector 180 to address the RAM 120, a set of control bits that determines the operation performed by the pre-op device 116, a control bit that determines the operation performed by the pre-op device 114, and so on. It will be recognized that the aforementioned fields within the instruction formats 201, 202 correspond substantially to these microcode control bits 455$b$. That is, in accordance with this aspect of the invention, the fields of the instruction formats 201, 202 are provided that substantially correspond to select elements of a microcode instruction 455 thereby facilitating a direct control of the underlying processing circuitry 450 with minimal overhead.

As illustrated in FIG. 4, the control fields 410 of an instruction 331, the fields other than the format field 210, are provided as input to a format mapper and default device 440 that maps each control field 410 of the instruction 331 to a corresponding control element in the microcode 455. Note that both the constant k 455$a$ and the control bits 455$b$ affect the operation and result provided by the processing circuitry 450, and are included in the definition of a control element of the microcode 455.

The mapper/default device 440 comprises a plurality of selectors 441–449 that route each bit of the control field 410 to a corresponding control bit 455$b$, depending upon the given format 210 of the instruction 331. That is, for example, in FIG. 2, the different instruction formats 201 and 202 include different fields (242, 280, 282) and (290, 220) in the bit positions 23–31 of the instruction. The mapper/default device 440 routes the different fields from the same bit position of an instruction to different control elements of the microcode instruction, depending upon the format 210 of the instruction 331.

In accordance with another aspect of this invention, the mapper/default device 440 appropriately controls the control elements of the microcode instruction 455 in the absence of a mapped field from the instruction 331, by providing default control values for each control element 455. That is, for example, the example instruction formats 201, 202 do not include a constant field for setting the value of k 455$a$ in the microcode instruction 455. The default interpretation for the absence of a specified constant field in an instruction 331 in a preferred embodiment is a null operation. That is, in the absence of a specified constant value, the value k 455$a$ remains the same. Alternatively, if the instruction contains an affirmative "k-follows" field 212, the next instruction 331 read from the ROM 330 will be mapped completely to the constant k 455$a$ of the microcode instruction 455. (For ease of understanding, the type mapper 430 is illustrated as receiving the format field 210 of the instruction 331 as a control input only. To support the "k-follows" feature, the type mapper/default device 440 is configured to route the entire instruction 331 to the constant k segment 455$a$ of the microcode instruction 455 whenever the previous instruction contains an affirmative k-follows field 212.)

In a preferred embodiment, the output of the multiplexer/selector associated with each control element 455 is dependent upon the content of the format field 210, and the inputs are dependent upon the available default options. For example, as discussed above, one or more format types (not illustrated) of a preferred embodiment contain a constant field that is less than the full width of the instruction word. When these format types are received, the corresponding multiplexers 441–449 are configured to select either a zero value or a sign-extended value to place in each of the unspecified higher-order bit locations of the constant k 455$a$. For example, if the constant field in the instruction contains six bits, the upper twenty-six bits of the 32-bit constant k 455$a$ may be set to a default value of zero, or to a default value that is equal to the most significant bit of the specified six bits (sign-extended value), depending upon the particular format type. The control bits 455$b$ are also provided default values, in most cases a null operation. The choice of a default value or condition for each control element of the microcode instruction 455 can be any value or condition, but in a preferred embodiment, the default values and conditions are chosen to be those that would be consistent with an assumed value by one of ordinary skill in the art. That is, for example, the zero-ing of higher order bits when a shortened data constant is provided, and the sign-extension of higher order bits when an address offset is provided, would be assumed to be proper defaults by one of ordinary skill in the art. In like manner, the default condition of the set of control bits corresponding to the next instruction field 290 of format 202 would be assumed to correspond to an advancement of the program counter by one instruction. That is, when an instruction having a format 201 is received, which does not contain a next instruction field 290, the default interpretation module 440 sets the appropriate control elements in the macroinstruction 455 corresponding to the absent field 290 such that the selectors 340, 350, and 370 are set to select the appropriate inputs to effect an increment of the program counter 310, thereby providing a consistent, predictable, and logical effect in the absence of an explicit instruction field.

The foregoing merely illustrates the principles of the invention. It will thus be appreciated that those skilled in the art will be able to devise various arrangements which, although not explicitly described or shown herein, embody the principles of the invention and are thus within its spirit and scope. For example, with regard to conditions that are determined based on multiple words of a data item, a condition element can be defined that identifies the most-significant non-zero word in a data item, to facilitate the control of multi-word operations such as multiplication and addition. Other techniques for minimizing the complexity of the illustrated design are also feasible. For example, the indirect address pointer, IDA 185 in FIG. 1, can be a predetermined address, such as address 0, of the RAM 120, so as to minimize the circuitry and time required to access an indirect address. In like manner, the data items that are addressed by the address registers 130 maybe constrained to lie within a specified area of the memory 120, so that the registers 120 can be of the minimum width required to span the addresses within this specified area, using for example an offset base address, rather than a width required to span the entire memory 120. Also, although the principles presented herein are particularly well suited for cryptography applications, the techniques and structures presented in this disclosure can be applied to processing systems that are customized for other applications, particularly those that utilize wide data-items and/or employ relatively simple but repetitive operations. In like manner, although the example embodiments are illustrated herein in a minimalist form, to achieve a low production cost, additional capabilities can be added to improve performance or to ease the programming task. The examples provided in the figures are presented for illustration purposes. For example, a single port RAM 120 is illustrated in FIG. 1, which provides for a minimal routing and interconnect area for addressing the RAM 120. A multiport RAM, such as a two or three port RAM, and an associated format type to accommodate the multiple addressing capabilities, would provide for multiple memory accesses in the same instruction cycle, a preset of memory addresses before the memory access, and so on, by employing the principles presented above. Other system configuration, application, and optimization techniques will be evident to one of ordinary skill in the art, in view of this invention, and are within the spirit and scope of the following claims.

We claim:

1. A processing system comprising:
    a processor that is configured to execute program instructions,
    a memory that is configured to contain operands, each operand having a corresponding operand address in the memory and
    at least one address register that is configured to contain an operand address; and
    wherein the processor is further configured to provide an address-zero flag that is asserted when the operand address is zero and wherein is configured to:
    receive the operand address from the processor, and
    provide the operand address as an addressing input to the memory only.

2. The processing system as claimed in claim 1, wherein
    the operand address lies within an operand-address-range, and
    is sized to be a minimum size required to contain a span of the operand-address-range.

3. The processing system of claim 1, wherein at least one instruction of the program instructions effects a modification of at least two address registers upon execution of the at least one instruction.

4. The processing system of claim 1, wherein
    the operand-address corresponds to a counting index, and
    the at least one address register is further configured to decrement the operand address in response to a decrement command from the processor, thereby providing a counting operation based on the counting index.

5. The processing system as claimed in claim 1, wherein:
    the operand address lies within an operand-address-range having a lower-address and an upper-address, and
    the program instructions include at least one of:
    a circular-increment instruction that
    increments the operand-address in the at least one address register, and
    resets the operand-address in the at least one address register to correspond to the lower-address when the operand-address in the at least one address register is greater than the upper-address,
    a circular-decrement instruction that
    decrements the operand-address in the at least one address register, and
    resets the operand-address in the at least one address register to correspond to the upper-address when the operand-address in the at least one address register is less than the lower-address,
    thereby constraining the operand-address in the at least one address register to lie within the operand-address-range.

6. The processing system as claimed in claim 5, further including at least one condition flag that is associated with at least one of:
    the operand-address equaling the lower-address, and
    the operand-address equaling the upper-address.

* * * * *